Feb. 19, 1952 — F. POSTMA — 2,586,379
LUBRICATION OF ENGINE BEARINGS
Filed Dec. 23, 1947
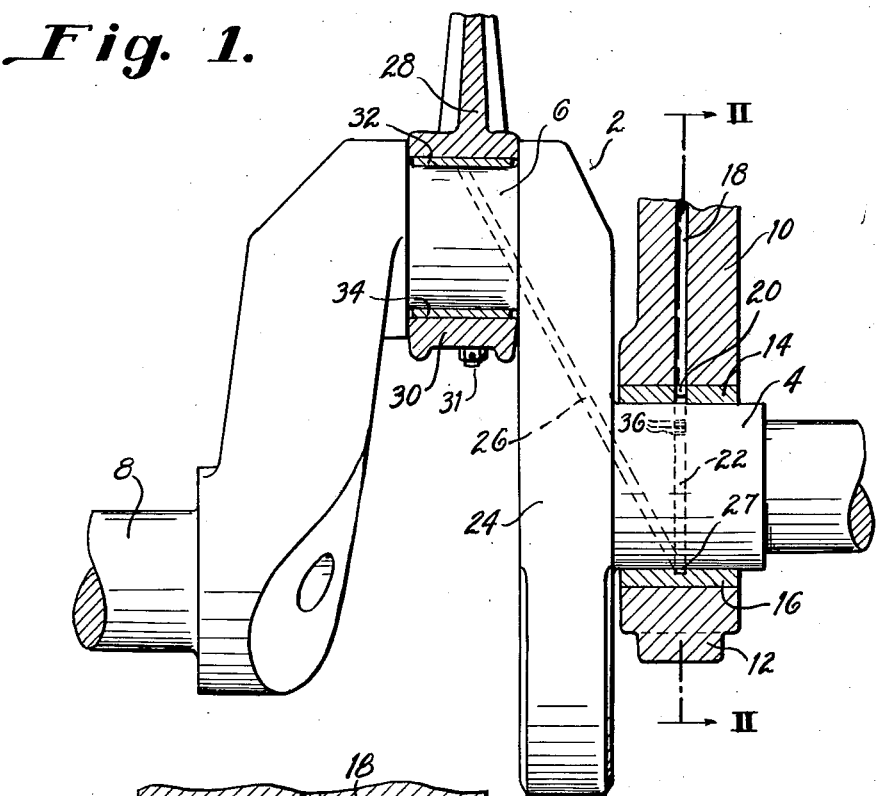
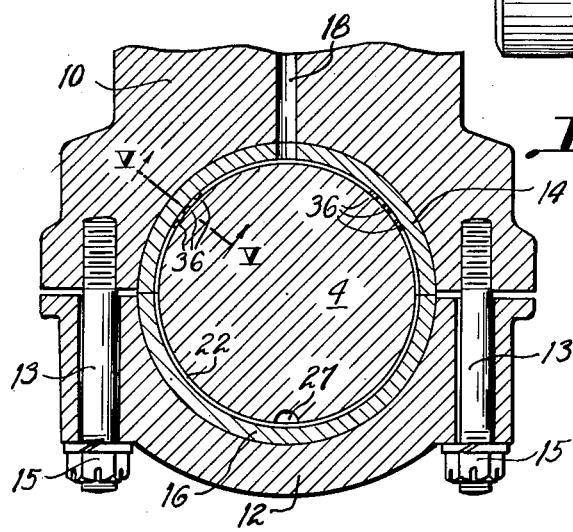
Inventor
Frank Postma
By Alfred W. Vibber
His Attorney Feb. 19, 1952            F. POSTMA           2,586,379
LUBRICATION OF ENGINE BEARINGS
Filed Dec. 23, 1947                                   3 Sheets—Sheet 2
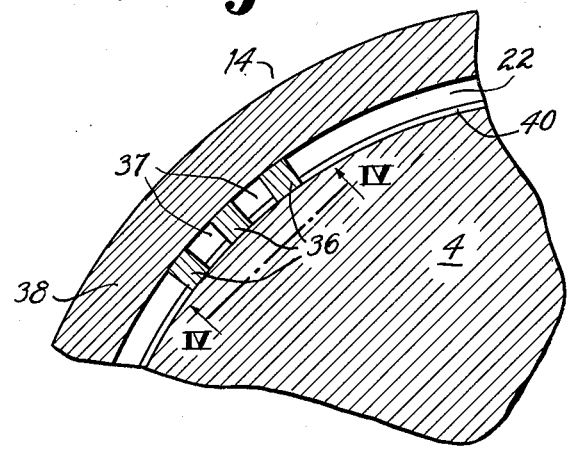
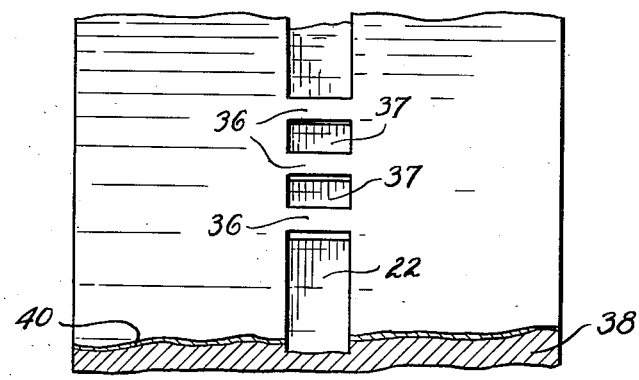
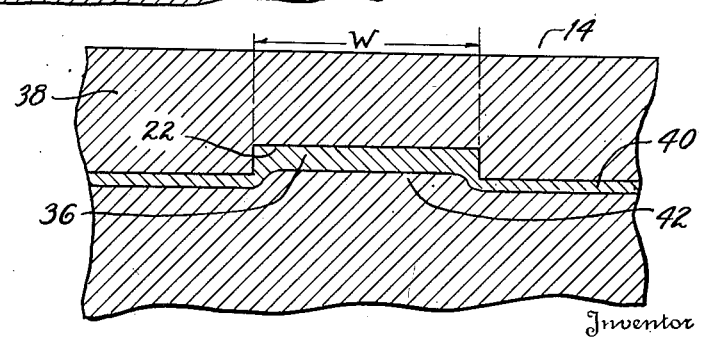
Inventor
Frank Postma
By Alfred W. Nibber
His Attorney Feb. 19, 1952   F. POSTMA   2,586,379
LUBRICATION OF ENGINE BEARINGS
Filed Dec. 23, 1947   3 Sheets-Sheet 3

Inventor
Frank Postma
By Alfred W. Nibber
His Attorney

Patented Feb. 19, 1952

2,586,379

UNITED STATES PATENT OFFICE 2,586,379

LUBRICATION OF ENGINE BEARINGS

Frank Postma, Glen Rock, N. J.

Application December 23, 1947, Serial No. 793,383

10 Claims. (Cl. 184—6)

This invention relates to an improved bearing for internal combustion engines such as automobile engines and the like, and more particularly, to a bearing for the main journals thereof, and to the combination of such improved main bearing with a crank shaft having at least one crank arm journal lubricated by lubricant which is supplied under pressure and is fed through the main journal bearing.

The invention has among its objects the provision of an improved bearing, particularly in the form of a removable bearing lining, for use with the main journal bearings of an internal combustion engine. Such bearing may be used to advantage with new, reground, or worn unreground main journals of internal combustion engines.

A further object of the invention resides in the combination of a crank shaft having a main journal and a crank arm journal, in which the crank arm journal is supplied with lubricant under pressure from the main bearing, and the improved bearing of the invention. Such combination results not only in the improved lubrication and operation of the main journal bearing, but also in the improved lubrication and operation of the crank arm journal and the engine as a whole, by reason of the fact that lubricant is supplied to the crank arm journal only in the requisite amounts.

These and further objects of the invention will be more readily apparent in the following description of preferred embodiments of the improved bearing, and of the combination of such bearing with a crank shaft wherein the crank arm journal is lubricated from the main bearing.

This application is a continuation-in-part of application Ser. No. 705,983 filed October 26, 1946, now Patent Number 2,554,154.

In many internal combustion engines, of which the automobile engine is typical, the crank arm journals are lubricated by lubricant supplied under pressure from an adjacent main bearing, the duct between the main bearing and the crank arm journal being an angularly disposed passage through the main journal, the crank arm, and the crank arm journal. A column of lubricant of considerable length is disposed in such passageway and is subjected to centrifugal force when the shaft rotates. Such rotation of the column, acting on the column which in the conventional engine is unbroken, produces a pump-like action which tends to supply the crank arm journal with much more lubricant than is necessary for its satisfactory lubrication. Excess lubricant thus leaks out of the crank arm journal and is thrown about within the engine, resulting in heavy deposits of lubricant on the cylinder walls and thus the consumption of a large amount thereof by burning in the cylinders.

Further amounts of lubricant leak out of the main bearings even when the engine is new and such bearings are tight. When the main journals wear, oil pressure is undesirably lowered as a result of excessive leakage, and carbonizing of oil in the cylinders is aggravated. The improved bearing of the invention, as above stated, may be employed with new, reground, or worn unreground main bearings. When employed with new or reground worn main bearings it particularly improves the lubrication of the crank arm journal by delivering only the requisite amount of oil thereto, although it does aid somewhat in improving lubrication of the main bearing by decreasing the amount of lubricant delivered to it. When employed with a worn unreground main bearing on which there exists a circumferential ridge in a position confronting the oil channel in the original bearing, the bearing of the invention displays perhaps its maximum advantages. In such application of the bearing, leakage of lubricant at the main bearing is minimized and crank arm journal lubrication is improved.

Such objects are obtained by the provision in the circumferential oil receiving channel of the bearing of a plurality of spaced sealing means or dams which effectively seal off a portion of the channel from the portion directly subjected to oil pressure from the oil-induction port. Such multiple sealing means or multiple dams are made of material which wears more readily and is more easily deformable than the metal of the journal, so that after installation of such bearing an effective seal is formed with the portion of the journal confronting the sealing means after but a relatively few revolutions of the crank shaft.

In the drawings appended hereto, which form a portion of the specification,

Figure 1 is a view of a portion of a crank shaft at a main bearing thereof, the view being partially in side elevation and partially in vertical section;

Figure 2 is a view in vertical section through the main journal bearing shown in Figure 1, the section being taken along the line II—II in Figure 1;

Figure 3 is a fragmental view of a portion of the structure shown in Figure 2, the view being taken along the same section line as Figure 2, and greatly enlarged;

Figure 4 is a view in elevation of the portion of the bearing lining in the vicinity of one of the multiple dams, such view being taken from the point of view indicated by line IV—IV in Figure 3;

Figure 5 is an enlarged view in section through the bearing lining, the bearing support, and the main journal, the section being taken along the line V—V in Figure 2. Such figure shows the structure of a worn unreground journal, of the bearing lining, and one of the dams in the channel of such lining which cooperates with the ridge on the worn journal;

Figure 6:
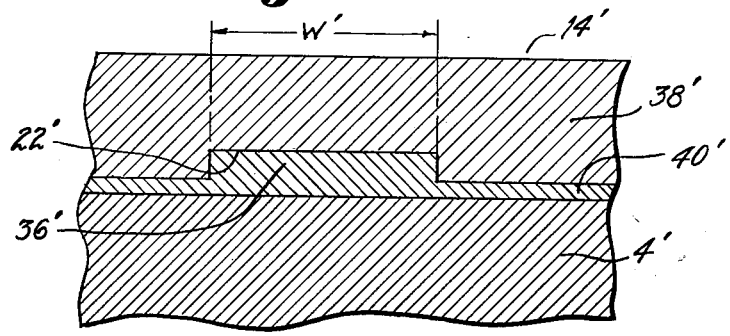
Figure 6 is a view similar to Figure 5, with the exception that the journal is either a new one or one which after use has been reground to circular cylindrical shape.

In Figures 1 and 2 a portion of a crank shaft in the vicinity of a main bearing is indicated generally by the reference character 2. The main bearing shown at 4 is in this instance the No. 1 main bearing journal of an automobile engine. At 6 is shown the crank journal for the No. 1 cylinder of the engine, and at 8 is shown the crank pin journal for the No. 2 cylinder, the engine in this instance being a six cylinder engine with four main bearings. The upper supporting structure for the main bearing shown, such support being integral with the motor block, is designated 10. The bearing supporting structure is completed by the removable bearing cap 12 secured to support 10 by the studs 13 and nuts 15, as shown in Figure 2. Supported in the structure composed of parts 10 and 12 is the two-piece removable bearing lining composed of the upper half 14 and the lower half 16.

Oil under pressure is supplied to the main bearing from the oil pump (not shown) of the automobile through passage 18 in structure 10, hole 20 in the upper bearing half 14 positioned in line with duct 18, and the circumferentially extending oil channel 22 in the inner faces of each of the bearing lining parts 14 and 16.

The crank arm journal 6 has positioned thereon the lower large end 28 of the No. 1 connecting rod, part 28 having connected thereto the bearing cap 30, which is held thereon by a pair of nuts, of which one is shown at 31. Within the circular opening provided by parts 28 and 30 is secured a two-piece removable bearing lining consisting of the upper half 32 and the lower half 34. Lubricant to the crank arm journal and bearing is supplied under pressure from the channel 22 of the adjacent main bearing through a passageway 26 drilled angularly through journal 6, crank arm 24, and journal 4, as shown, the end 27 of passageway 26 confronting channel 22. It is to be understood that although in the embodiment shown the main bearing constitutes the source of lubricant under pressure to but one adjacent crank pin journal, it might be employed to supply it to two or more crank pin journals adjacent thereto.

The improvement in the main journal bearing in the embodiment shown in Figures 1 to 3, inclusive, consists in the provision of a plurality of sets of sealing means, each set consisting of a plurality of spaced sealing means or dams, at two zones of the bearing, one set on one side of the oil induction port 20 and spaced therefrom, and one set on the other side of such port and spaced therefrom, as shown in Figure 2. Such construction results in the sealing off from the remainder of the channel of that portion which is located between the sets of multiple dams and which is in communication with port 20. As a result, a much smaller quantity of oil is present in the main bearing at any time than would be present if the channel 22 were unobstructed. Suitable angular spacing of the sets of multiple dams about the circumference of the main bearing makes it possible to supply to the main bearing a predetermined amount of lubricant which is sufficient only for its needs and for the requirements of the crank pin journal fed thereby.

Figures 3 and 4 show more particularly the structure of the dams and depict such dams resulting from a preferred method of their manufacture. The bearing lining portion 14 is composed of a semi-cylindrical steel shell or backing member 38 provided with a circumferentially disposed oil channel 22 formed therein. The broad inner surface of shell 38 is coated with a relatively thin layer of bearing metal 40 which is softer than the steel. A typical metal used for such purpose is Babbitt metal. Bearing metal layer 40 is usually cast into the shell 38 with the latter positioned in a mold. Multiple dams 36 may conveniently be formed integral with the layer of bearing metal 40 by use of a mold having a main core which is in the form of a cylinder spaced from the internal surface of the shell 38 and a plurality of smaller suitably spaced and suitably dimensioned cores projecting into channel 22, so that casting of the bearing metal results in the formation of dams 36 integral with layer 40, each of such dams completely filling the channel at its location, leaving the remainder of the channel open and unobstructed. Such dams 36 are separated by spaces 37 in which the cores projected. The interior surface of the bearing lining portion 14 with the layer 40 and the dams 36 thus cast thereon is then finished accurately to size. It is to be understood that various other methods may be employed for forming the bearing lining and the dams in the channel thereof, but that the above method is presently preferred when the dams are formed at the same time as the bearing metal layer. Where existing bearings or bearing lining members are to be treated in accordance with this invention the dams, preferably made of bearing metal, may be cast into the channel as a separate step, such dams becoming integrally attached to the shell 38 and the bearing metal layer 40.

In Figure 5 there is shown the structure of a worn unreground main journal and of the bearing lining of the present invention cooperating therewith after the engine has been run for a short time. There is shown in this figure a crankshaft main bearing journal of a car which has been run for many thousands of miles and which has a ridge 42 thereon at the position which confronted the circumferential oil channel in the original main bearing of the car. Such ridge, which is shown of exaggerated height for clearness of illustration, has rounded corners, as shown, due to the fact that both the journal and the original bearing lining wore, and because the shaft had some end play. In Figure 5 the channel 22 of the replacement bearing lining part 14 has a width W somewhat in excess of the width of the channel of the original bearing which has been replaced. As a typical example in an automotive engine, the width of channel 22 of bearing lining part 14 may exceed the width of the channel in the original bearing by .010". The ridge 42 thus has its ends lying within the projected inner edges of channel 22. When the replacement bearing linings 14 and 16 have been installed and the bearing cap 12 tightened, each of the multiple dams 36, because of their thinness and softness, will be deformed somewhat to flow about ridge 42 even before the crankshaft is turned. After a very short period of running of the engine each of the dams will have deformed sufficiently to conform to the shape of the ridge and to flow about the edges thereof as shown in Figure 5.

The use of multiple dams in accordance with the present invention has been found preferable to the use of a single slug or dam in one zone of the lining. Since the multiple dams are quite thin, as before mentioned, they are readily deformed and the spaces between them provide freedom for the material in the dams to flow circumferentially of the bearing. Thus the multiple dams wear in and provide a tight seal very quickly as compared to the single slugs. Furthermore, the use of such multiple dams provides a much tighter seal between the bearing lining and journal than is possible with a single member.

The improved bearing of the invention, as above indicated, may also be used to advantage with main journals which are either new or have been reground to truly cylindrical shape. The structure of either of such two types of journals in combination with the bearing of the invention at one of the multiple dams is shown in Figure 6, wherein parts similar to those shown in Figure 5 are designated by the same reference character primed. In such installation there is no ridge on the journal 4', and thus the metal of the dams 36' is not deformed in advance any more than is the metal in bearing lining 40'. The width W' of oil channel 22' may be made standard in this instance, since there is no ridge on the journal with which it must cooperate.

As a typical example of bearings for the usual automobile engines, the dams 36 and 36' may be $\frac{3}{32}$" thick, and of such depth and width, as shown, to fill the oil channel. Preferably the dams are spaced apart distances somewhat greater than the thickness of each, a typical spacing for the example given being $\frac{3}{16}$" between dams. As will be seen from the above and also in Figs. 2 and 3, each of the dams has a thickness measured circumferentially of the bearing lining member which is a small part of the inner circumference of the bearing lining member. As can be seen from the above typical example and also in Figs. 2 and 3, the dams are spaced from each other circumferentially of the bearing by distances which are on the same order of magnitude as the circumferential thickness of each dam.

The function of the multiple dams as they effect the lubrication of the main journal bearing has been adequately described. It will be apparent upon consideration of Figures 1 and 2 that they also function, in conjunction with the end 27 of duct 26, as a valve so that oil is delivered under pressure to duct 26 only when end 27 of the duct lies between the sets of multiple dams 36. As a result, the column of oil in duct 26 is periodically interrupted, and the syphoning action which would otherwise operate upon such column is eliminated. Consequently, there is delivered to the crank pin journal only that amount of oil predetermined by the angular spacing of the sets of dams 36, the oil pressure, and the cross-sectional areas of the various oil passages.

Figure 7:
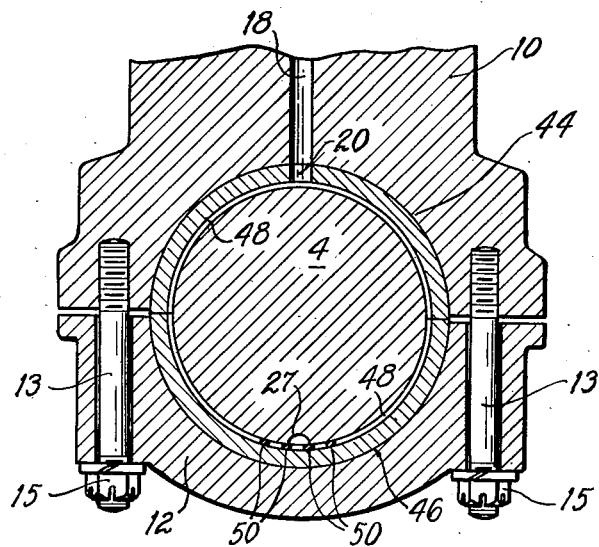
Figure 7 is a view similar to Figure 2 of a modified bearing lining made in accordance with the invention, the multiple dams being located in one zone thereof.

Although the multiple dam set arrangement shown in Figures 1 and 2 is preferred, the invention also displays advantages when but one set of multiple dams is employed in a bearing. Such arrangement is shown in Figure 7 in which the same reference characters are employed to designate those parts which are the same as those shown in Figure 2. In Figure 7 the upper bearing lining element is designated 44 and the lower bearing lining element 46, the circumferential oil channel in both such elements being designated 48. In this embodiment, there is employed but one multiple dam set. Such set, which is composed of dams 50, is located in one zone of the bearing; in Figure 7 such zone is at the bottom of the bearing.

It will be apparent that the improved bearing shown in Figure 7 limits to some degree the amount of oil present in the main bearing. More important than this, however, is the fact that it functions as a valve and intermittently stops feeding of oil to the crank pin journal. Such stoppage of flow occurs when the end 27 of the angular duct 26 leading to the crank arm journal is opposite the multiple dams. Thus the column of oil leading to the crank pin journal is broken, syphoning is eliminated, and an accurate predetermined quantity of oil is fed to the crank pin journal.

Although I have shown and described preferred embodiments of the improved bearing and of the combination of such bearing with a crank shaft in which the crank pin journal is lubricated from the main journal, it is to be understood that such embodiments are illustrative only and that both the bearing and the combination of bearing and crankshaft are capable of considerable variation as to details within the scope of the invention.

I claim as new the following:

1. An annular bearing lining member adapted to be mounted within the bore of an annular receiving member and to journal a rotary member therewithin, the receiving member having an oil-induction passage leading to its bore, the bearing lining member having a relatively thick backing element and a relatively thin layer of bearing metal affixed to the inner face of such backing element, the bearing lining member having an interior oil-receiving channel formed around the axis of said lining member and an intake port connected with the channel and adapted to connect with the passage in the receiving member, a set of a plurality of sealing dams each of which has a thickness measured circumferentially of the bearing lining member which is a small part of the inner circumference of the bearing lining member, said dams being spaced from each other circumferentially of the bearing by distances which are on the same order of magnitude as the circumferential thickness of each dam, each of said dams filling the channel at its location, the spaces between dams being of a radial depth which is at least a substantial part of the radial depth of the channel, said dams sealing off from the remainder of the channel, when the rotary member is mounted within the bearing, the part of the circumferential extent of the channel to which said port discharges, said dams being disposed to be wiped by the perimeter of the rotary member.

2. An annular bearing lining member adapted to be mounted within the bore of an annular receiving member and to journal a rotary member therewithin, the receiving member having an oil-induction passage leading to its bore, the bearing lining member having an interior oil-receiving channel formed around the axis of said lining member and an intake port connecting with the channel and adapted to connect with the passage in the receiving member, means sealing off from the remainder of the channel, when the rotary member is mounted within the bearing, the part of the circumferential extent of the channel to which said part discharges, said sealing means comprising two sets of a plurality of sealing dams, each of said dams having a thickness measured circumferentially of the bearing lining member which is a small part of the inner circumference of the bearing lining member, the dams of each set being spaced from each other circumferentially of the bearing by distances which are on the same order of magnitude as the circumferential thickness of each dam, each of said dams filling the channel at its location, the spaces between the dams in each set being of a radial depth which is at least a substantial part of the radial depth of the channel, one set of dams being located in the circumferential channel on one side of the port and the other set of sealing dams being located in the channel on the other side of the port, the dams being disposed to be wiped by the perimeter of the rotary member.

3. An annular bearing lining member adapted to be mounted within the bore of an annular receiving member and to journal a rotary member therewithin, the receiving member having an oil-induction passage leading to its bore, the bearing lining member having a relatively thick backing element and a relatively thin layer of bearing metal affixed to the inner face thereof, the bearing lining member having an interior oil-receiving channel formed around the axis of said lining member and an intake port connected with the channel and adapted to connect with the passage in the receiving member, means sealing off from the remainder of the channel, when the rotary member is mounted in the bearing, the part of the circumferential extent of the channel to which said port discharges, said sealing means comprising two sets of a plurality of sealing dams, each of said sealing dams having a thickness measured circumferentially of the bearing lining member which is a small part of the inner circumference of the bearing lining member, the dams of each set being spaced from each other circumferentially of the bearing by distances which are on the same order of magnitude as the circumferential thickness of each dam, one set of dams being located in the circumferential channel on one side of the port and the other set of sealing dams being located in the channel on the other side of the port, said dams filling the channel at their location and being fixedly connected to the bearing lining member, the spaces between dams in each set being of a depth which is at least a substantial part of the radial depth of the channel, said dams being disposed to be wiped by the perimeter of the rotary member.

4. An annular bearing lining member adapted to be mounted within the bore of an annular receiving member and to journal a rotary member therewithin, the receiving member having an oil-induction passage leading to its bore, the bearing lining member having a relatively thick backing element and a relatively thin layer of bearing metal affixed to the inner face thereof, the bearing lining member having an interior oil-receiving channel formed around the axis of said lining member and an intake port connected with the channel and adapted to connect with the passage in the receiving member, means sealing off from the remainder of the channel, when the rotary member is mounted in the bearing, the part of the circumferential extent of the channel to which said port discharges, said sealing means comprising two sets of a plurality of sealing dams, each of said sealing dams having a thickness measured circumferentially of the bearing lining member which is a small part of the inner circumference of the bearing lining member, the dams of each set being spaced from each other circumferentially of the bearing by distances which are on the same order of magnitude as (but somewhat greater than), the circumferential thickness of each dam, one set of dams being located in the circumferential channel on one side of the port at an angle of less than 90° therefrom and the other set of sealing dams being located in the channel on the other side of the port at an angle of less than 90° therefrom, said dams filling the channel at their location and being fixedly connected to the bearing lining member, the spaces between dams in each set having a depth which is at least equal to the radial depth of the channel, said dams being disposed to be wiped by the perimeter of the rotary member.

5. The combination of a crankshaft having at least one main journal and at least one crank arm and journal, a bearing on the crank arm journal, means to feed lubricant under pressure through the main journal, the crank arm, and the crank arm journal from the main journal to a position between the crank arm journal and bearing comprising a passageway through such members, a main journal bearing, means to support the main journal bearing, and means to feed lubricant under pressure between the main journal and the main journal bearing, the main journal bearing having an oil-induction passage leading to its bore, said passage constituting a portion of the last named means, said main journal bearing having an interior channel formed around its axis and connected to the oil-induction passage, the inner end of the passageway in the main journal which feeds lubricant to the crank journal confronting the channel, and means sealing off from the remainder of the channel the part of the circumferential extent of the channel to which said oil-induction passage discharges, said sealing means comprising a set of a plurality of sealing dams, each of said sealing dams having a thickness measured circumferentially of the bearing lining member which is a small part of the inner circumference of the bearing lining member, the dams being spaced from each other circumferentially of the bearing by distances which are on the same order as the circumferential thickness of each dam, the spaces between the dams in the set being of a depth which is at least a substantial part of the radial depth of the channel, the sealing dams being fixed in the bearing lining member and so disposed as to be wiped by the perimeter of the main journal, whereby the amount of lubricant present between the main journal and the main journal bearing is limited and the feeding of lubricant to the crank journal is periodically discontinued as the crank shaft rotates.

6. The combination of a crankshaft having at least one main journal and at least one crank arm and journal, a bearing on the crank arm journal, means to feed lubricant under pressure through the main journal, the crank arm, and the crank arm journal from the main journal to a position between the crank arm journal and bearing comprising a passageway through such members, a main journal bearing, means to support the main journal bearing, and means to feed lubricant under pressure between the main journal and the main journal bearing, the main journal bearing having an oil-induction passage leading to its bore, said passage constituting a portion of the last named means, said main journal bearing having an interior channel formed around its axis and connected to the oil-induction passage, the inner end of the passageway in the main journal which feeds lubricant to the crank journal confronting the channel, and means sealing off from the remainder of the channel a part of the circumferential extent of the channel and to which part said oil-induction passage discharges, said sealing means comprising two sets of a plurality of sealing dams, each of said dams having a thickness measured circumferentially of the bearing lining member which is a small part of the inner circumference of the bearing lining member, the dams of each set being spaced from each other circumferentially of the bearing by distances which are on the same order of magnitude as the circumferential thickness of each dam, one set of dams being located in the circumferential channel on one side of the port and the other set of sealing dams being located in the channel on the other side of the port, said sealing dams being fixed in the bearing member and so disposed as to be wiped by the perimeter of the main journal, the spaces between dams in each set having a depth which is at least a substantial part of the radial depth of the channel, whereby the amount of lubricant present between the main journal and the main journal bearing is limited and the feeding of lubricant to the crank journal is periodically discontinued as the crank shaft rotates.

7. The combination of a worn journal member having a circumferential ridge thereon intermediate its ends, an annular receiving member containing in its bore the journal member and having an oil-induction passage leading to said bore, an annular bearing lining member fixed in the bore and having an interior channel formed around the axis of said lining member, the channel in the bearing lining member being wider than the circumferential ridge on the journal, the ridge being centrally received within the channel, and an intake port connecting said passage and channel, means sealing off from the remainder of the channel the part of the circumferential extent of the channel to which said port discharges, said sealing means comprising a set of a plurality of sealing dams, each such sealing dam having a thickness measured circumferentially of the bearing lining member which is a small part of the inner circumference of the bearing lining member, the dams being spaced from each other circumferentially of the bearing by distances which are on the same order of magnitude as the circumferential thickness of each dam, said sealing dams being fixed in the lining member and so disposed as to be wiped by the perimeter of the journal member at the circumferential ridge thereon, the spaces between dams being of depths which are at least a substantial part of the radial depth of the channel, said sealing dams spanning the ridge and effecting a seal therewith and with the portions of the main journal on both sides of the ridge, whereby the amount of lubricant present between the journal and the journal bearing is limited.

8. The combination of a worn journal member having a circumferential ridge thereon intermediate its ends, an annular receiving member containing in its bore the journal member and having an oil-induction passage leading to said bore, and an annular lining member in the bore and having an interior channel formed around the axis of said lining member, the channel in the bearing member being wider than the circumferential ridge on the journal, the ridge being centrally received within the channel, and an intake port connecting said passage and channel, means sealing off from the remainder of the channel a part of the circumferential extent of the channel and to which part said port discharges, said sealing means comprising two sets of a plurality of sealing dams, each dam having a thickness measured circumferentially of the bearing lining member which is a small part of the inner circumference of the bearing lining member, the dams of each set being spaced from each other circumferentially of the bearing by distances which are on the same order of magnitude as the circumferential thickness of each dam, one set of dams being located in a circumferential channel on one side of the port and the other set of dams being located in the channel on the other side of the port, the sealing dams being fixed in the lining member and being so disposed as to be wiped by the perimeter of the rotary member at the circumferential ridge thereon, the spaces between dams having depths which are at least a substantial part of the radial depth of the channel, said sealing dams spanning the ridge and effecting a seal therewith and with the portion of the journal on both sides of the ridge, whereby the amount of lubricant present between the journal and the journal bearing is limited.

9. The combination of a worn crankshaft having at least one main journal and at least one crank arm and journal, a bearing on the crank arm journal, means to feed lubricant under pressure through the main journal, the crank arm, and the crank arm journal from the main journal to a position between the crank arm journal and bearing comprising a passageway through such members, the main journal being worn so that it has a circumferential ridge thereon intermediate its ends, a main journal bearing, means to support the main journal bearing, and means to feed lubricant under pressure between the main journal and the main journal bearing, the main journal bearing having an oil-induction passage leading to its bore, said passage constituting a portion of the last named means, said main journal bearing having an interior channel formed around its axis, connected to the oil-induction passage, and confronting the circumferential ridge on the main journal, the channel in the main journal bearing being wider than the circumferential ridge on the main journal, the ridge being centrally received within the channel, the inner end of the passageway in the main journal which feeds lubricant to the crank journal confronting the channel, and means sealing off from the remainder of the channel the part of the circumferential extent of the channel to which said oil-induction passage discharges, said sealing means comprising a set of a plurality of sealing dams, each of said dams having a thickness measured circumferentially of the bearing lining member which is a small part of the inner circumference of the bearing lining member, the dams being spaced from each other circumferentially of the bearing by distances which are on the same order of magnitude as the circumferential thickness of each dam, the dams being fixed in the bearing lining member and disposed to be wiped by the perimeter of the main journal member at the circumferential ridge thereon, the spaces between the dams having radial depths which are at least a substantial part of the radial depth of the channel, said sealing dams spanning the ridge and effecting a seal therewith and with the portions of the main journal on both sides of the ridge, whereby the amount of lubricant present between the main journal and the main journal bearing is limited and the feeding of lubricant to the main journal is periodically discontinued as the crank shaft rotates.

10. The combination of a worn crankshaft having at least one main journal and at least one crank arm and journal, a bearing on the crank arm journal, means to feed lubricant under pressure through the main journal, the crank arm, and the crank arm journal from the main journal to a position between the crank arm journal and bearing comprising a passageway through such members, the main journal being worn so that it has a circumferential ridge thereon intermediate its ends, a main journal bearing, means to support the main journal bearing, and means to feed lubricant under pressure between the main journal and the main journal bearing, the main journal bearing having an oil-induction passage leading to its bore, said passage constituting a portion of the last named means, said main journal bearing having an interior channel formed around its axis, connected to the oil-induction passage, and confronting the circumferential ridge on the main journal, the channel in the main journal bearing being wider than the circumferential ridge on the main journal, the ridge being centrally received within the channel, the inner end of the passageway in the main journal which feeds lubricant to the crank journal confronting the channel, and means sealing off from the remainder of the channel the part of the circumferential extent of the channel to which said oil-induction passage discharges, said sealing means comprising two sets of a plurality of sealing dams, each dam having a thickness measured circumferentially of the bearing lining member which is a small part of the inner circumference of the bearing lining member, the dams of each set being spaced from each other circumferentially of the bearing by distances which are on the same order of magnitude as, but somewhat greater than, the circumferential thickness of each dam, the dams being fixed to the bearing lining member and disposed to be wiped by the perimeter of the main journal bearing at the circumferential ridge thereon, the spaces between dams in each set having radial depths which are at least equal to the radial depth of the channel, the sealing dams spanning the ridge and effecting a seal therewith and with the portions of the main journal on both sides of the ridge, one set of sealing dams being located in the circumferential channel on one side of the part at an angle of less than 90° therefrom and the other set of sealing dams being located in the channel on the other side of the port at an angle of less than 90° therefrom, whereby the amount of lubricant present between the main journal and the main journal bearing is limited and the feeding of lubricant to the crank journal is periodically discontinued as the crank shaft rotates.

FRANK POSTMA.

REFERENCES CITED

The following references are of record in the file of this patent:

UNITED STATES PATENTS

| Number | Name | Date |
|---|---|---|
| 1,117,256 | Schwitzer | Nov. 17, 1914 |
| 1,302,564 | Klocke | May 6, 1919 |
| 1,354,852 | Schneider | Oct. 5, 1920 |
| 1,748,120 | Fisher | Feb. 25, 1930 |
| 1,944,609 | Palm | Jan. 23, 1934 |
| 2,004,254 | Taub | June 11, 1935 |
| 2,131,170 | Evans | Sept. 27, 1938 |
| 2,199,699 | Frelin | May 7, 1940 |